Patented Jan. 27, 1948

2,434,953

UNITED STATES PATENT OFFICE 2,434,953

LOWER ALKYLPOLYSILOXANEBORATES AND THEIR PRODUCTION

Winton I. Patnode, Schenectady, N. Y., assignor to General Electric Company, a corporation of New York No Drawing. Original application July 1, 1944, Serial No. 543,209. Divided and this application November 30, 1945, Serial No. 632,132

5 Claims. (Cl. 260—607)

This application is a division of my copending application Serial No. 543,209, filed July 1, 1944, and assigned to the same assignee as the present invention.

The invention disclosed and claimed in the above-identified parent application Serial No. 543,209 broadly relates to the treatment of solid bodies to render the surfaces thereof water-repellent, and is especially concerned with a water-repellent treatment for ceramic and other vitreous bodies, e. g., glass.

Methods of producing water-repellent materials by treating water-non-repellent bodies, including ceramic bodies, with organo-silicon halides (organohalogenosilanes) in vapor form are described in, for example, my Patent No. 2,306,-222, issued December 22, 1942, and assigned to the same assignee as the present invention.

Briefly described, the invention disclosed and claimed in my above-identified parent application is based on the discovery that the surfaces of solid bodies, particularly the surfaces of ceramic articles, can be conveniently rendered water-repellent by treatment with lower alkyl polysiloxanes containing halgen atoms or other reactive substituents (more specifically radicals or groups) connected to some of the silicon atoms. Examples of polysiloxanes which can be employed in practicing the invention claimed in parent application Serial No. 543,209 are the symmetrical methyl dichlorosiloxanes and other lower-alkyl-halogenosiloxanes described in my application Serial No. 463,812, filed October 29, 1942, now Patent No. 2,381,366, issued August 7, 1945, and assigned to the same assignee as the present invention, more particularly organo-silicon compounds having the formula $X(SiR_2O)_nSiR_2X$ wherein X represents a halogen atom, R represents a monovalent lower alkyl group, and $n$ is a whole number and is equal to at least 1, e. g., tetramethyl-1.2-dichlorodisiloxane, hexamethyl-1,3-dichlorotrisiloxane, octamethyl-1,4-dichlorotetrasiloxane, etc.

Examples of other polysiloxanes that can be employed in carrying into effect the invention claimed in the aforementioned parent application are the corresponding esters, borates and amines of the siloxane derivatives claimed in my aforementioned Patent No. 2,381,366, which compounds may be prepared by, for example, reacting these and other halogenosiloxanes to be described more fully hereinafter with suitable aliphatic alcohols, boric acid or ammonia. The invention claimed in the present divisional application is concerned particularly with compositions comprising the borate derivatives, and more specifically with compositions comprising the Si-containing (i. e., silicon-containing) material or complex obtained by effecting reaction between boric acid and lower-alkylhalogenopolysiloxane substance containing an average of from about 0.16 to 1.0 halogen atom per silicon atom.

Glass and other vitreous and ceramic materials that have been treated in accordance with the invention disclosed and claimed in the above-identified parent application have been found to have water-repellent surfaces which are superior to those obtained by the use of organo-silicon halides both in durability and effectiveness. The compounds employed in practicing that invention are easier to handle and apply than are the organo-silicon halides, since they contain smaller proportions of halogen, if any. Hence they are more stable and give off less hydrogen halide, if any, when applied to the surfaces to be treated, and they appear to produce a more effective surface. By substituting other hydrolyzable groups for all or part of the halogen atoms in the halogenopolysiloxanes, products are obtained which are particularly adapted for use on, or in the neighborhood of, surfaces attacked by hydrogen halides.

Although the invention claimed in my parent copending application Serial No. 543,209 is applicable to the treatment of a number of inorganic materials, it is particularly adapted to the treatment of glass products where optical clarity of the treated glass is of prime importance. Since the treatment can be applied without the use of any special apparatus, it is ideally suited as an anti-rain treatment for windshields and windows in automobiles, ships, swiftly moving vehicles such as aircraft, etc. A small quantity of the treating compound or a solution thereof in an inert solvent such as toluene, gasoline, ethers, etc., is applied to the surface of the glass and the excess material is rubbed off with a clean cloth. There is no visible film on the treated surface. Windows and windshields so treated permit better visibility in a rainstorm than do the untreated windows and windshields. Under some icing or frosting conditions the treatment definitely retards loss of visibility due to the formation of ice or frost, and any ice or frost which does collect is more easily removed from treated surfaces, by wiping or by heat, than from untreated surfaces.

There is apparently a chemical reaction between the treating material and the vitreous surface, since the treated surfaces can be washed with soap and water, or with alcohol, acetone, benzene, etc., or rubbed with a cloth without losing their water-repellent or anti-rain properties. This treatment not only increases the contact angle between water and glass, but also increases the ease with which the drops slide off the glass. The treating compounds in themselves function as cleaning fluids for the glass surfaces. If desired, various inert cleaning solvents or mild abrasives such as talc, chalk or infusorial earth may be added to the compounds to improve this cleaning action. Household glassware and dishes benefit from treatment with the herein described treating compounds in that they are more easily kept clean and are much easier to dry after washing. The treatment also retards the formation of the opaque film which sometimes appears on glass, thus maintaining the original appearance.

The substituted lower alkyl polysiloxanes found to be suitable for practicing the invention claimed in my above-identified parent copending application include the pure or mixed methyl, ethyl and propyl polysiloxanes containing at least one, preferably approximately two, hydrolyzable atoms or groups connected to silicon atoms. The hydrolyzable substituents may be halogens, particularly chlorine or bromine atoms, or lower alkoxy radicals, amino radicals or borate radicals. For maximum water-repellency and ease of application, I prefer to employ the polyalkyl-chloropolysiloxanes, particularly the straight-chain, halogenated polysiloxanes or mixtures of such polysiloxanes having the general formula $X(SiR_2O)_nSiR_2X$, where X represents a halogen atom, specifically a chlorine atom, R represents a monovalent lower alkyl group, particularly a methyl group, and $n$ is an integer equal to at least 1, preferably from 3 to about 7. Such polysiloxanes contain an average of from about 0.25 to 1, preferably 0.3 to 0.5, halogen atom per silicon atom. In other words, an average of from about 0.25 to 1, preferably 0.3 to 0.5, of the silicon atoms are each connected to a halogen atom. Other suitable halogeno-polysiloxanes include the halogenated branched-chain polysiloxanes and halogenated polysiloxanes containing terminal $R_3Si$-groups. Such compounds can be prepared, for example, by partial hydrolysis of dialkyldihalogenosilanes such as dimethyldichlorosilane containing up to approximately 10 per cent, by weight, of a trialkylhalogenosilane, such as trimethylchlorosilane, or an alkyltrihalogenosilane such as methyltrichlorosilane, or both, to the point where the principal products are lower alkyl polysiloxanes containing one or more halogen atoms per molecule. Halogenopolysiloxanes or mixtures thereof especially suitable for use in practicing the invention claimed in parent application Serial No. 543,209 contain from 2 to 8 silicon atoms, have an average R/Si ratio of from about 1.8 to 2.5 and an average Hal/Si (halogen/silicon) ratio of from 0.16 to 1, preferably 0.3 to 0.5, the remaining valences of the silicon atoms being taken up by oxygen.

When the treatment is to be applied to, or in the neighborhood of, unprotected metal surfaces which are readily corroded by hydrogen halides, it may be found desirable to employ polysiloxanes of the above type in which all or part (i. e., at least some) of the halogens attached to silicon have been replaced by the less corrosive amino, lower alkoxy or borate (oxyboron) radicals. The esters usually should contain some halogen attached to silicon or a small quantity of a hydrogen halide, or should be applied as mixtures with the halogenopolysiloxanes to increase the chemical reactivity of the esters.

The borates with which the present invention is concerned, more particularly borates of lower-alkylhalogenopolysiloxane substance that contains an average of from about 0.16 to 1.0 halogen atom per silicon atom, can be prepared by treating the corresponding halogenopolysiloxane substance with boric acid. For example, 12.4 grams of boric acid was partially dissolved and partially suspended in 200 cc. of glacial acetic acid, and to the mixture was added dropwise over a period of 20 minutes 105.4 grams of a halogeno polysiloxane represented by the formula $$Cl[(CH_3)_2SiO]_3(CH_3)_2SiCl$$

and which may be named octamethyl-1, 4-dichlorotetrasiloxane. Stirring was continued throughout addition and for 1½ hours afterwards. The reaction mixture separated into two phases after stirring was stopped. The upper phase containing the reaction product was separated from the acetic acid and a small portion thereof was applied to a glass surface. A very faint opaqueness was noticed after the excess had been rubbed off. The surface was water-repellent, and when washed with alcohol became perfectly transparent without losing its water-repellent qualities. The original opaqueness was probably due to precipitated boric acid formed on hydrolysis or by reaction with the glass surface, which acid was dissolved or washed away by the alcohol.

The treating agents hereinbefore described are applicable not only to the treatment of glass surfaces to render such surfaces water-repellent, but also to all types of ceramic articles and surfaces of a siliceous character, including glazed or enamelled articles, porcelain, quartz, glass fiber, etc. Metals such as stainless steel, nickel, Phosphor bronze and aluminum are examples of other organic materials, the surfaces of which can be rendered water-repellent by treatment with the polysiloxane derivatives described herein.

From the foregoing description it will be seen that the present invention provides new and useful compositions of matter comprising a borate of lower alkyl (e. g., methyl) halogeno-polysiloxane substance containing an average of from about 0.16 to 1.0 halogen atom per silicon atom, more particularly a borate of lower alkyl (e. g., methyl) chloropolysiloxane substance containing an average of from about 0.16 to 1.0 chlorine atom per silicon atom, including liquid compositions comprising a solution of a borate of the kind just described. Such borates, all of which are Si-containing materials, are obtained by, for example, effecting reaction between boric acid and lower-alkylhalogenopolysiloxane substance containing an average of from about 0.16 to 1.0 halogen atom per silicon atom. Also within the scope of the present invention are products comprising the Si-containing composition or complex produced by reaction between (1) boric acid and (2) a substance corresponding to the general formula $$X(SiR_2O)_nSiR_2X$$

where X represents a halogen atom, R represents a monovalent lower alkyl group, an $n$ is an integer which is at least 1 and not more than 7, said substance having an average R/Si ratio of from about 1.8 to 2.5 and containing an average of from about 0.25 to 1 halogen atom per silicon atom, a specific example of the substance of (2) being octamethyl-1,4-dichlorotetrasiloxane.

The scope of the invention also includes method features, more particularly the method of preparing a new Si-containing material which comprises effecting reaction between boric acid and a lower-alkylhalogenopolysiloxane substance containing an average of from about 0.16 to 1.0 halogen atom, specifically a chlorine atom, per silicon atom; as well as the method of preparing a new Si-containing material which is especially suitable for use in the treatment of solid bodies to render the surfaces thereof water-repellent, said method comprising effecting reaction between boric acid and octamethyl-1,4-dichlorotetrasiloxane, and isolating the resulting Si-containing material from the reaction mass.

What I claim as new and desire to secure by Letters Patent of the United States is:

1. A composition comprising a borate of lower-alkylpolysiloxane.

2. A liquid composition comprising a solution of a borate of lower-alkylpolysiloxane substance containing an average of from about 0.16 to 1.0 borate radical per silicon atom.

3. A product comprising a borate of lower-alkylpolysiloxane substance containing an average of from about 0.16 to 1 borate radical per silicon atom.

4. As a new composition of matter, a borate of methylpolysiloxane substance containing an average of from about 0.16 to 1.0 borate radical per silicon atom.

5. The method of preparing a new Si-containing material which comprises mixing boric acid and lower-alkylhalogenopolysiloxane substance containing an average of from about 0.16 to 1.0 halogen atom per silicon atom.

WINTON I. PATNODE.

REFERENCES CITED

The following references are of record in the file of this patent:

UNITED STATES PATENTS

| Number | Name | Date |
| --- | --- | --- |
| 2,190,746 | Von Glahn | Feb. 20, 1940 |
| 2,371,068 | Rachow | Mar. 6, 1945 |